UNITED STATES PATENT OFFICE.

GEORGE D. VAN ARSDALE, OF NEW YORK, N. Y.

PROCESS OF SEPARATING COPPER FROM ORES.

SPECIFICATION forming part of Letters Patent No. 723,949, dated March 31, 1903.

Application filed July 26, 1902. Serial No. 117,187. (No specimens.)

*To all whom it may concern:*

Be it known that I, GEORGE D. VAN ARSDALE, a citizen of the United States, residing at New York, in the county of New York and State of New York, have invented certain new and useful Improvements in Processes of Separating Copper from Ores, of which the following is a specification.

This invention has relation to the separation of copper from ore by the wet process, the essential feature of which is the utilization of sulfur dioxid as a precipitant of the copper from a solution of cupric sulfate, whereby free sulfuric acid is formed for redissolving the copper from ore or matte to take the place of that eliminated by precipitation, the process being continuous and admitting of the acid solution being repeatedly used. It is possible to recover copper from ore containing a small percentage of lime or bases other than copper, as an excess of free sulfuric acid is produced over and above the amount necessary to regenerate the solution.

In practicing the invention the copper ore to be treated must contain the copper in the oxidized state and is crushed or comminuted and the copper removed by lixiviation or leaching with an acid solution of cupric sulfate, and this solution is subsequently saturated with sulfur dioxid to effect a precipitation of the copper which is effected by heat.

The process is a continuous or regenerative one, the only reagent required being sulfur dioxid, which is a waste product in many places, or may in some cases be obtained by roasting the ore to be treated. The process can be applied to all ores or other products containing copper, such as matte. It is necessary, however, to roast sulfids in order to render the copper soluble, and this kind of ore will yield in most cases more sulfur dioxid than is required for subsequent treatment of the solutions. An advantage which this process possesses over all other wet processes is that it may be used for ores containing lime, as will be more fully stated hereinafter.

The ore which is to be treated must contain the copper in the oxidized state, which, as stated above, may be for sulfid ores accomplished by roasting. In case roasting is necessary this should be done in some suitable furnace arranged so that the sulfur gases may be used as afterward described. The ore should be crushed before leaching to a suitable fineness, depending on its character.

The original solution for leaching must contain cupric sulfate and should contain ferrous sulfate, (or other suitable sulfate, such as manganous sulfate; but I prefer ferrous sulfate, and this will be used as a type of these in the further description,) and this may be made up in a number of ways, dependent on local conditions. Where liquors containing ferrous sulfate are a waste product, these may be employed and the proper amount of cupric sulfate dissolved in them, whereupon they will be ready for use in the manner presently stated. Where these liquors are not available, it is necessary to dissolve crystals of cupric sulfate and ferrous sulfate in water. No special proportions or concentration of these is necessary or claimed. Thus a reaction takes place with cupric sulfate alone, resulting in the separation of a salt of copper and the formation of free sulfuric acid; but my experience has been that by adding ferrous sulfate the reaction proceeds better, and that, further, by the use of a proper proportion of ferrous sulfate there is obtained a precipitate of metallic copper, and I therefore prefer to use ferrous sulfate in addition to cupric sulfate. It will also be found in practice that the solutions will always contain more or less ferrous sulfate dissolved from the ores treated. I have, however, obtained good results from a solution containing approximately ten per cent. each of cupric sulfate and ferrous sulfate, and prefer to use such a solution. After such a solution is prepared sulfur-dioxid gas, which may be obtained from any suitable source, is caused to be absorbed by the solution until the latter is nearly saturated, which can be accomplished by passing the gas through the solution contained in a suitable vessel. The solution is then heated to approximately its boiling temperature, whereupon a reaction takes place, resulting in the precipitation of a part of the copper contained in the solution either as metallic copper or compounds of copper, or both, together with the formation of free sulfuric acid. It is not necessary in all cases to heat the solution to boiling, as the temperature at which the reaction occurs varies with the composition of the solution. With a solution as described above, containing about ten per cent. each cupric and ferrous sulfates, the temperature at which the reaction is complete is about 94° centigrade. The amount of copper which will be precipitated will vary with the composition of the solution and also with the pressure under which it is heated. It is also desirable where the solution is heated under atmospheric pressure to exclude oxygen, which may be done by heating in an atmosphere of sulfur dioxid or otherwise. I prefer, however, to heat under pressure, as by this means an increased precipitation of copper is obtained, and I have thus obtained from the above ten-per-cent. solution by heating to about 94° centigrade under a pressure of about ten pounds to the square inch a precipitate containing about fifty per cent. of the copper originally present and an amount of free sulfuric acid corresponding to about double the amount necessary to redissolve from ore the amount of copper precipitated. It is not necessary to precipitate all of the copper, as the liquors are used continuously; but in case this is desired it may be accomplished by allowing the liquors to cool, again saturating with sulfur dioxid, and heating as before, when a further amount of copper will separate, and this operation may be repeated until sufficient copper is precipitated. In case it becomes necessary to discard a portion of the liquors they may be freed from the last traces of copper by any convenient means, such as passing them over scrap-iron.

Where a single heating, yielding about fifty per cent. of the original copper, is considered sufficient, further operations are as follows: The copper precipitate is separated from the liquors by drawing the latter off or otherwise and the precipitate treated as desired. If pure, it requires simply to be melted and cast; but if impure it may be smelted as a part of a furnace charge.

After separation of the precipitate the ore, crushed to a suitable fineness, is added to the acid liquors. The amount of the ore added should be approximately sufficient to replace the amount of copper precipitated, and the solution may be accomplished in any convenient way, best by percolation, without stirring, as in this way extensive settling or the use of a filter-press may be avoided. An ore containing small percentage of lime or bases other than copper in not too large amounts may be used, since there is produced, as stated, an excess of acid over the amount necessary to regenerate the original solutions. After solution of the copper from the ore is complete the solution is separated from the residues and sulfur-dioxid gas passed through or absorbed, as at first, and the solution again heated, as before, giving a further precipitate of copper and acid liquors for solution of additional copper from ores, and the operation may be thus repeated indefinitely, or until the solutions become too foul with accumulated impurities or dissolved salts of iron, &c. If this is the case, the solution may be purified by known methods or a part freed from copper and rejected.

I am aware of the process patented by James Douglas and S. T. Hunt, which consists in passing sulfur dioxid gases through a solution containing cupric chlorid and sodium chlorid, by which is obtained a precipitate of cuprous chlorid and free sulfuric and hydrochloric acid; but my process differs from theirs in, first, using cupric sulfate instead of chlorid, and, second, in requiring no sodium chlorid or other chlorid.

I am also aware of the process patented by Roessler, which consists in the production of free acid for leaching by heating a solution of cupric sulfate and passing air and sulfur dioxid; but my process differs from his in that, first, I obtain a precipitate of copper, as well as a production of free acid, and, second, that I inject no air into the solutions for oxidizing the same.

I am also aware of the United States Patent No. 650,784, and my process differs from the one therein described in that I do not claim the use of sulfur dioxid as a means of solution of copper, but as a precipitant of copper and a means of simultaneously generating free sulfuric acid, and that I do not introduce sulfur dioxid at any time during the solution of the copper.

As is evident from the foregoing, I do not claim the use of sulfur dioxid as a means of dissolving copper directly, nor do I claim any special manner of working or apparatus; but I do claim the general process of extracting copper from ores, the principle of which is embodied in the following claims:

1. In the process of separating copper from a solution containing cupric sulfate, the step of impregnating said solution with sulfur dioxid only to effect a separation of the copper by precipitation, substantially as set forth.

2. In the process of separating copper from a solution containing cupric sulfate, the step of impregnating said solution with sulfur dioxid, then heating the solution to effect a precipitation of the copper and the formation of free sulfuric acid, substantially as specified.

3. In the process of separating copper from a solution containing cupric sulfate, the step of impregnating said solution with sulfur dioxid and heating in an atmosphere free from oxygen to effect a precipitation of the copper and the formation of free sulfuric acid, substantially as set forth.

4. In the process of separating copper from a solution containing cupric sulfate, the step of impregnating said solution with sulfur dioxid, then heating the solution and at the same time subjecting it to pressure to effect a precipitation of the copper and the formation of free sulfuric acid, substantially as set forth.

5. The process substantially as described, of extracting copper from ores, or products containing copper, which consists in separating copper from cupric-sulfate solutions, with or without ferrous or other suitable sulfate and of simultaneously producing free sulfuric acid, by adding to such solutions sulfur dioxid and heating with or without pressure, whereby copper or copper compounds are thrown down in the solid form, to be subsequently treated, and free sulfuric acid is formed and of adding the acid liquors thus obtained, after separation from the copper precipitate, to copper ores, whereby the copper contained in them is dissolved and the original solution regenerated and the process repeated and thus made continuous as described.

In testimony whereof I affix my signature in presence of two witnesses.

GEORGE D. VAN ARSDALE. [L. S.]

Witnesses:
SEATON M. SCOTT,
T. W. ATTERBURY.